United States Patent
Takubo

(10) Patent No.: US 9,014,157 B2
(45) Date of Patent: Apr. 21, 2015

(54) RADIO NETWORK SYSTEM

(75) Inventor: Hiroshi Takubo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1189 days.

(21) Appl. No.: 12/633,610

(22) Filed: Dec. 8, 2009

(65) Prior Publication Data

US 2010/0150071 A1    Jun. 17, 2010

(30) Foreign Application Priority Data

Dec. 11, 2008    (JP) ................ 2008-316048

(51) Int. Cl.
*H04W 4/00*    (2009.01)
*H04W 60/04*   (2009.01)
*H04W 84/04*   (2009.01)

(52) U.S. Cl.
CPC ............ *H04W 60/04* (2013.01); *H04W 84/045* (2013.01)

(58) Field of Classification Search
CPC ............................ H04W 60/04; H04W 84/045
USPC .................................................. 370/328, 338
See application file for complete search history.

(56) References Cited

U.S. PATENT DOCUMENTS

| | | | | |
|---|---|---|---|---|
| 6,253,079 B1* | 6/2001 | Valentine et al. | ............. | 455/428 |
| 8,285,877 B1* | 10/2012 | Herz et al. | ................. | 709/246 |
| 2004/0162077 A1* | 8/2004 | Kauranen et al. | ............. | 455/445 |
| 2004/0192254 A1* | 9/2004 | Choi et al. | ................... | 455/411 |
| 2005/0124341 A1* | 6/2005 | Myllymaki et al. | ........ | 455/435.1 |
| 2005/0261005 A1* | 11/2005 | Hu | .............................. | 455/456.5 |

(Continued)

FOREIGN PATENT DOCUMENTS

| JP | 2001-78249 A | 3/2001 |
|---|---|---|
| JP | 2006-74404 A | 3/2006 |

OTHER PUBLICATIONS

3rd Generation Partnership Project, "Technical Specification Group Services and System Aspects; Network Sharing; Architecture and functional description(Release 7)", 3GPP TS 23.251, V7.0.0 Jun. 2007, 7-15.

(Continued)

*Primary Examiner* — Shripal Khajuria
*Assistant Examiner* — Faisal Choudhury
(74) *Attorney, Agent, or Firm* — Fujitsu Patent Center

(57) ABSTRACT

The radio network system includes a plurality of mobile stations, a radio network controller operable to receive first location registration information for a location registration request from the mobile station, operable to transmit second location registration information including a femtocell identifier used to identify that the radio network controller is a device for a femtocell in the first location registration information to a first core network device, a first core network device operable to receive the second location registration information transmitted from the radio network controller, operable to transmit location registration rejection information used to indicate a rejection of storing location information to the radio network controller, and a second core network device operable to receive the second location registration information transmitted from the radio network controller that have received the location registration rejection information transmitted from the first core network device.

11 Claims, 9 Drawing Sheets

(56) References Cited

U.S. PATENT DOCUMENTS

| | | | |
|---|---|---|---|
| 2007/0010290 A1* | 1/2007 | Iida et al. | 455/560 |
| 2007/0270152 A1* | 11/2007 | Nylander et al. | 455/445 |
| 2008/0108347 A1* | 5/2008 | Jiang | 455/433 |
| 2008/0305792 A1* | 12/2008 | Khetawat et al. | 455/435.1 |
| 2009/0075660 A1* | 3/2009 | Hallenstal et al. | 455/437 |
| 2009/0170520 A1* | 7/2009 | Jones | 455/439 |
| 2009/0213834 A1* | 8/2009 | Amirijoo et al. | 370/352 |
| 2009/0233574 A1* | 9/2009 | Shinozaki | 455/404.2 |
| 2010/0150071 A1* | 6/2010 | Takubo | 370/328 |
| 2010/0315973 A1* | 12/2010 | Hirano et al. | 370/254 |
| 2011/0009113 A1* | 1/2011 | Vikberg et al. | 455/422.1 |

OTHER PUBLICATIONS

Nokia Siemens Networks, Nokia, "Impact on S1AP from HeNB GW concept," R3-080156, 3GPP TSG RAN WG3 Meeting #59, Sorrento, Italy, Feb. 11-15, 2008, 3 pages.

Nokia Siemens Networks, Mitsubishi Electric, "Impact on S1AP from HeNB GW concept," R3080465, 3GPP TSG RAN WG3 Meeting #59, Sorrento, Italy, Feb. 11-15, 2008, 5 pages.

Japanese Office Action mailed Nov. 6, 2012 for corresponding Japanese Application No. 2008-316048, with Partial English-language Translation.

\* cited by examiner

FIG. 8

| | |
|---|---|
| SI11 | MESSAGE TYPE |
| SI12 | CN DOMAIN INDICATOR |
| SI13 | LAI |
| SI14 | RAC |
| SI15 | SAI |
| SI16 | NAS-PDU |
| SI17 | IU SIGNALLING CONNECTION IDENTIFIER |
| SI18 | GLOBAL RNC-ID |
| SI19 | : |
| SI20 | : |
| SI21 | PERMANENT NAS UE IDENTIFY |
| SI22 | FEMTO FLAG |

1 : FEMTO-DEVICE
0 : EXCEPT FEMTO-DEVICE

RADIO NETWORK SYSTEM

CROSS-REFERENCE TO RELATED APPLICATION

This application is based upon and claims the benefit of priority of the prior Japanese Patent Application No. 2008-316048, filed on Dec. 11, 2008, the entire contents of which are incorporated herein by reference.

FIELD

The embodiments discussed herein are related to a radio network system.

BACKGROUND

Third Generation Partnership Project (3GPP) which discusses the specifications for the third generation mobile communication systems provides location registration control of radio terminals.

Upon receiving a communication start request from a user, a radio terminal is connected over a radio link to a radio network controller (RNC) via a radio base station (Node-B). Then, the radio terminal performs authentication and ciphering processing with a core network (CN) device via the Node-B and the RNC, and the radio terminal is connected to the CN device with a radio access line. These behaviors are indicated in FIG. 5 of 3GPP TS 23.251 V7.0.0 (3rd Generation Partnership Project; Technical Specification Group Services and System Aspects; Network Sharing; Architecture and functional description (Release 7)).

For example, a serving GPRS support node (SGSN: Serving General packet radio service Support Node) of a CN device performs location management, security management, access control and the like of a radio terminal, and performs location registration by storing subscriber data, such as location information of the radio terminal, in a visitor location register (VLR). However, in a case where the storage amount of the VLR exceeds an allowable range, location registration may not be performed. Thus, the radio terminal may be dealt with as being located in an out-of-service area.

In addition, in order to easily deal with an expected increase in the number of radio terminals, a device for femtocell (hereinafter, described as femto-RNC) that has both the functions of Node-B and RNC and that controls a small number of radio link connections with radio terminals has been introduced. However, in a case where a location registration request is issued from a radio terminal under the control of a femto-RNC, if the above-mentioned storage amount of a VLR in an SGSN that controls the femto-RNC exceeds an allowable range, a situation in which the radio terminal is subjected to out-of-service processing occurs even though the femto-RNC has been installed in order to deal with the expected increase in the number of radio terminals.

SUMMARY

According to an aspect of the embodiment, there is provided a radio network system including a plurality of mobile stations, a radio network controller operable to receive first location registration information for a location registration request from the mobile station, operable to transmit second location registration information including a femtocell identifier used to identify that the radio network controller is a device for a femtocell in the first location registration information to a first core network device, a first core network device operable to receive the second location registration information transmitted from the radio network controller, operable to transmit location registration rejection information used to indicate a rejection of storing location information to the radio network controller, and a second core network device operable to receive the second location registration information transmitted from the radio network controller that have received the location registration rejection information transmitted from the first core network device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating a message in a radio interface initial layer to be transmitted from a radio network controller to a core network device.

DESCRIPTION OF EMBODIMENT

Figure 1:
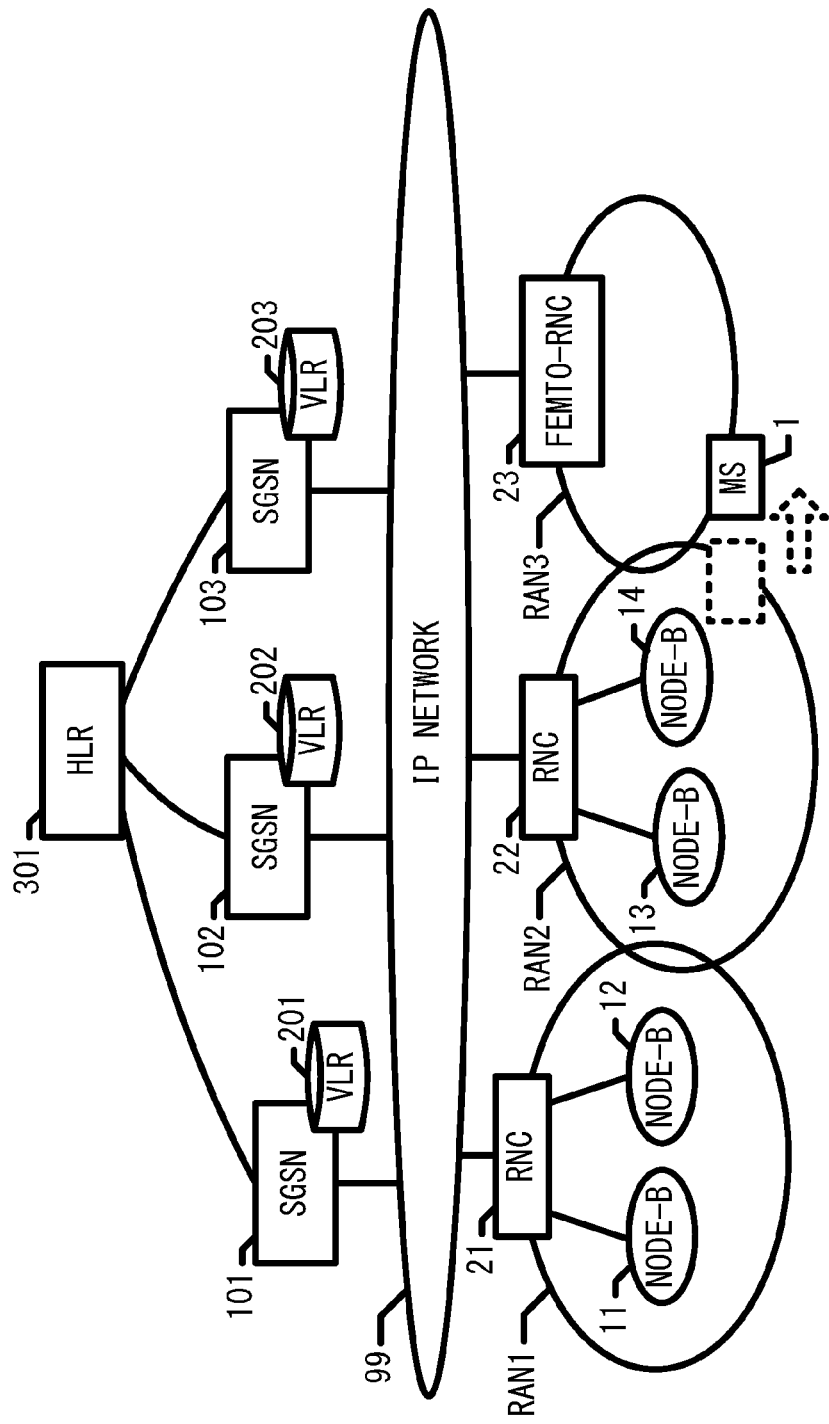
FIG. 1 is a diagram illustrating the configuration of a radio network system.

Hereinafter, an embodiment will be explained with reference to the drawings. Note that in the drawings, the same or similar parts are denoted by the same reference numerals or signs.

FIG. 1 is a diagram illustrating the configuration of a radio network system. Reference numeral 1 denotes a radio terminal (hereinafter, described as MS: Mobile Station or UE: User Equipment), reference numerals 11, 12, 13 and 14 denote radio base stations (Node-B) (in a case where reference numerals 11, 12, 13 and 14 are generically called "Node-B", reference numeral 10 is used), reference numerals 21 and 22 denote radio network controllers (RNC) (in a case where reference numerals 21 and 22 are generically called "RNC", reference numeral 20 is used), and reference numeral 23 denotes a small-sized radio network controller (femto-RNC) having both the functions of a Node-B 10 and an RNC 20. The femto-RNC may be called a femtocell base station. Reference signs RAN1, RAN2 and RAN3 denote radio access networks (RAN), reference numeral 99 denotes an IP (Internet Protocol) network, and reference numerals 101, 102 and 103 denote serving GPRS (General Packet Radio Service) support nodes (SGSN: Serving GPRS Support Nodes) (in a case where reference numerals 101, 102 and 103 are generically called "SGSN", reference numeral 100 is used). Reference numerals 201, 202 and 203 denote visitor location registers (VLR) (in a case where reference numerals 201, 202 and 203 are generically called "VLR", reference numeral 200 is used), and reference numeral 301 denotes a home location register (HLR). The Node-B 11 and the Node-B 12 are arranged under the control of the RNC 21, so that RAN1 is formed. The Node-B 13 and the Node-B 14 are arranged under the control of the RNC 22, so that RAN2 is formed. RAN3 is formed under the control of the femto-RNC 23. The SGSN 100 and the HLR 301 form a core network (CN). The SGSNs 100 may be called core network devices. RAN1 to RAN3 are connected through the IP network 99 to the CN.

In FIG. 1, the SGSN 101 controls the RNC 21, performs location management, security management, access control and the like of radio terminals located within RAN1. And the SGSN 101 stores in the VLR 201 subscriber data, such as location information of the radio terminals, stored in the HLR 301 so as to perform registration of the location of the radio terminal. Similarly, the SGSN 102 controls the RNC 22, and stores in the VLR 202 location information of radio terminals located within RAN2. Accordingly, the SGSN 102 performs registration of the locations of the radio terminals. In addition, the SGSN 103 controls the femto-RNC 23, performs location management, security management, access control and the like of radio terminals located within RAN3, and stores in the VLR 203 subscriber data, such as location information of the radio terminals, stored in the HLR 301. Accordingly, the SGSN 103 performs registration of the locations of the radio terminals.

For example, when the MS 1 moves and thus the radio access area in which the MS 1 locates changes from RAN2 to RAN3 or when the power of the MS 1 is turned on within RAN3, the MS 1 issues a location registration request in order that the location information is registered. Location registration information used in the location registration request is transferred via the femto-RNC 23 to the SGSN 103 that controls RAN3, and is processed by the SGSN 103. That is, the SGSN 103 performs location registration by storing subscriber data such as location information of the MS 1 in the VLR 203, the subscriber data being stored in the HLR 301, in accordance with the transferred location registration information of the MS 1.

Thus, in a case where the storage amount of the VLR 203 exceeds an allowable range, location registration of a radio terminal is not performed. Consequently, the radio terminal is subjected to out-of-service processing and ends in an out-of-call state.

Figure 2:
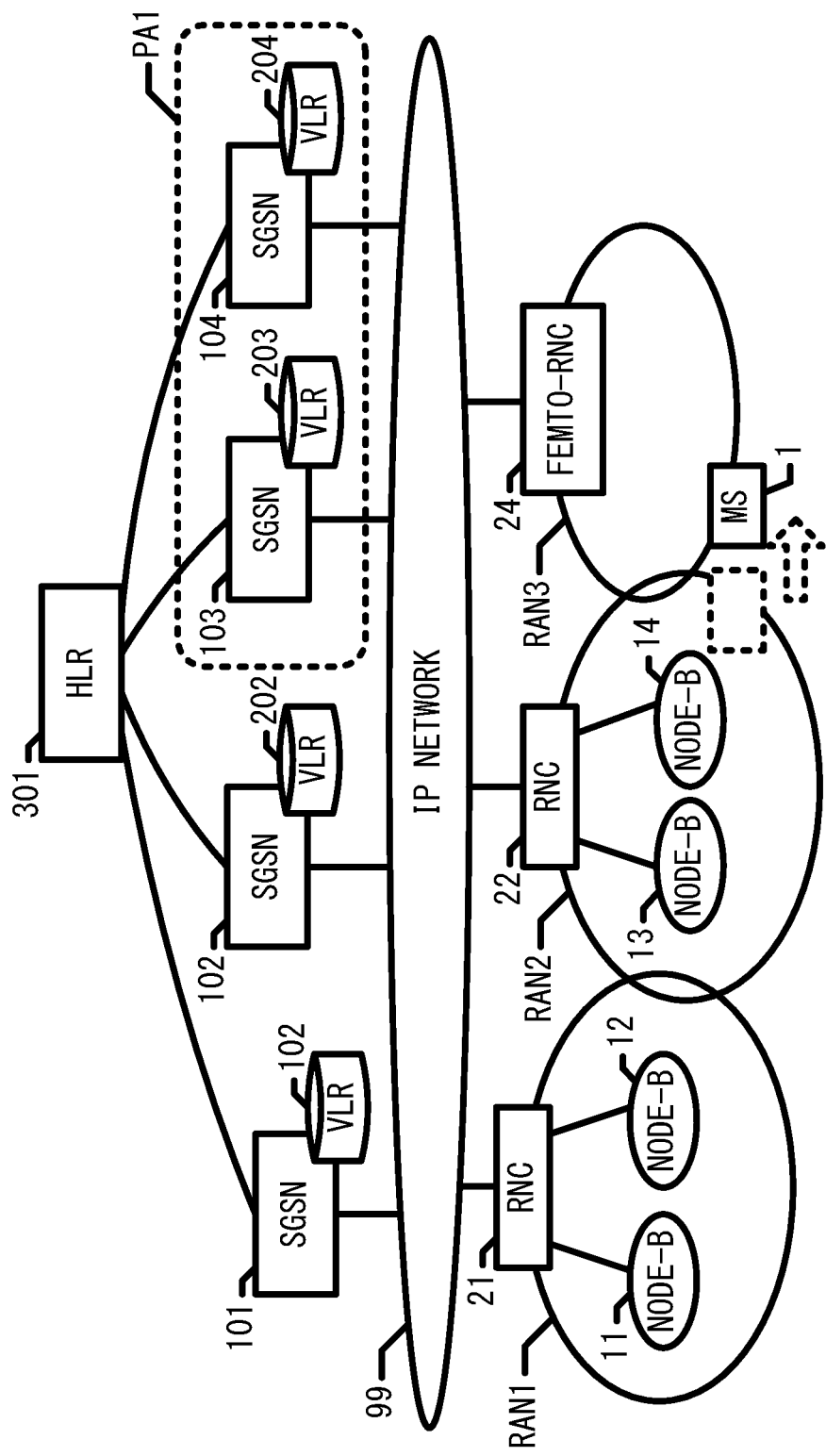
FIG. 2 is a diagram illustrating the configuration of a radio network system for explaining an example of an embodiment.

FIG. 2 is a diagram illustrating the configuration of a radio network system for explaining an example of an embodiment. An SGSN 104 and a VLR 204 are added to the configuration illustrated in FIG. 1. In addition, a femto-RNC is denoted by reference numeral 24.

An area (pool area) PA1, which includes SGSN 100 that control the femto-RNC 24, is provided. The SGSN 103 and the SGSN 104 are arranged in PA1 as SGSN 100 that is selected by the femto-RNC 24.

For example, when the MS 1 issues a location registration request, location registration information used in the location registration request is transferred via the femto-RNC 24 to the SGSN 103 controlling RAN3. The SGSN 103 performs location registration by storing in the VLR 203 subscriber data, such as location information of the MS 1, stored in the HLR 301, in accordance with the location registration information.

Here, if the storage amount of the VLR 203 exceeds an allowable range, the femto-RNC 24 transfers the location registration information to the SGSN 104 selected by the femto-RNC 24. The SGSN 104 performs location registration by storing in the VLR 204 the subscriber data, such as location information of the MS 1, stored in the HLR 301, in accordance with the transferred location registration information.

Figure 3:
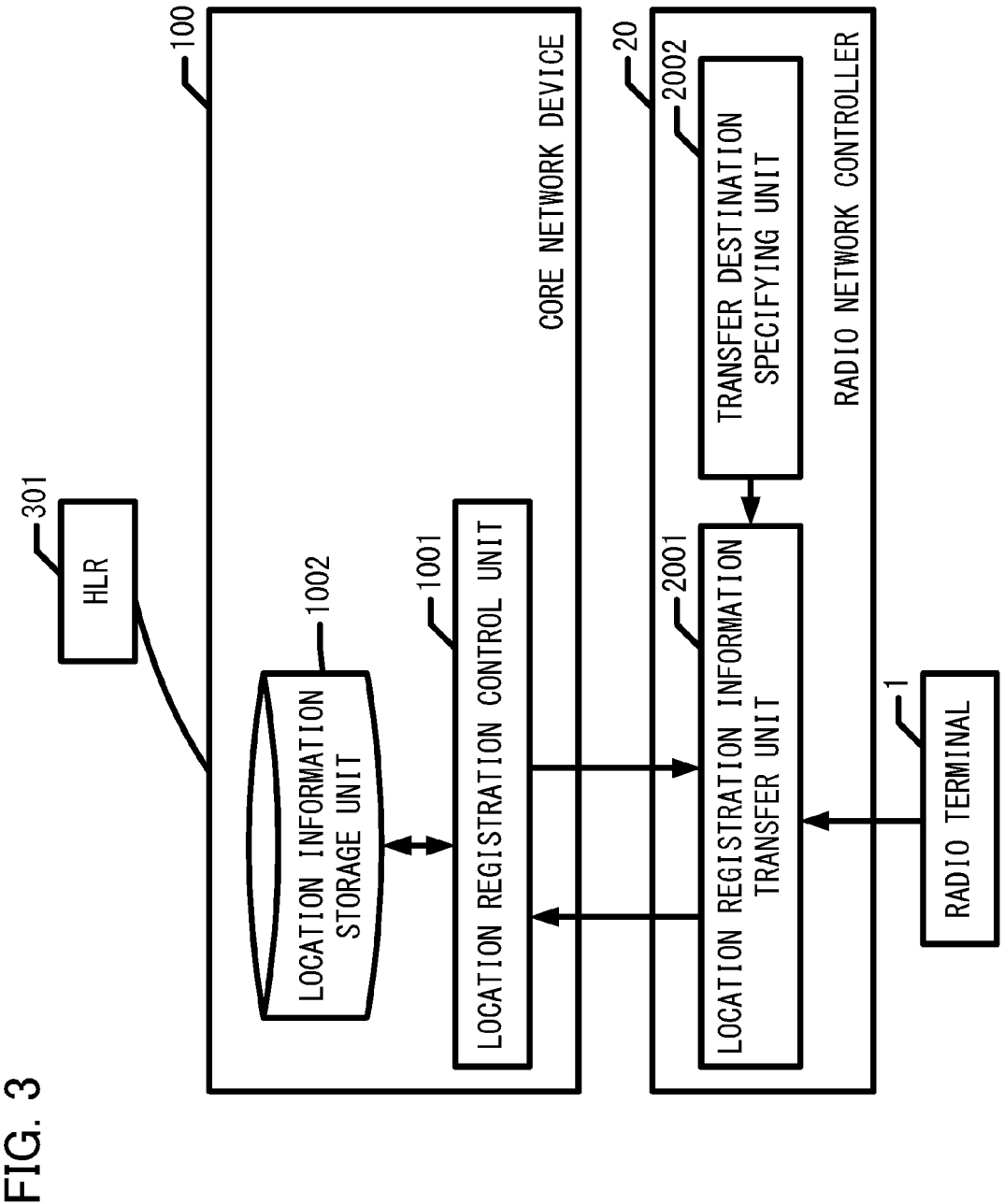
FIG. 3 is a diagram illustrating a configuration regarding a process for transferring location registration information transmitted from a radio terminal.

FIG. 3 is a diagram illustrating a configuration regarding a process for transferring location registration information transmitted from a radio terminal. Reference numeral 20 denotes a radio network controller corresponding to the femto-RNC 24 in FIG. 2. Reference numeral 2001 denotes a location registration information transfer unit, and reference numeral 2002 denotes a transfer destination specifying unit. Reference numeral 100 denotes a core network device corresponding to the SGSN 103 in FIG. 2. Reference numeral 1001 denotes a location registration control unit, and reference numeral 1002 denotes a location information storage unit. Note that the location information storage unit 1002 corresponds to the VLR 203 in FIG. 2. Reference numeral 301 denotes a home location register (HLR).

The radio terminal 1 transmits location registration information. The transmitted location registration information is received at the location registration information transfer unit 2001 of the radio network controller 20 allocated in a radio access area in which the radio terminal 1 locates.

Information on core network devices 100 that are selected by the radio network controller 20 is stored in the transfer destination specifying unit 2002. Selection priority is stored in association with the core network devices.

The location registration information transfer unit 2001 selects a core network device 100 to which the location registration information is to be transferred, in accordance with the selection priority from the transfer destination specifying unit 2002. Then, the location registration information transfer unit 2001 transfers the location registration information to the selected core network device 100.

The location registration control unit 1001 of the core network device 100 that has received the location registration information determines whether or not the storage amount of the location information storage unit 1002 falls within an allowable range. If it is determined, in accordance with the determination result, that the storage amount falls within the allowable range, the location registration control unit 1001 performs control in such a manner that subscriber data, such as location information of the radio terminal 1, stored in the HLR 301 is stored in the location information storage unit 1002, in accordance with the location registration information. Meanwhile, if it is determined, in accordance with the determination result, that the storage amount exceeds the allowable range, the location registration control unit 1001 transmits location registration rejection information to the radio network controller 20, from which the location registration information has been transferred. In accordance with the location registration rejection information, the radio network controller 20 is notified that location registration has been rejected.

The radio network controller 20 receives the location registration rejection information, selects a core network device 100 of the next-highest priority in accordance with the selection priority from the transfer destination specifying unit 2002, and transfers the location registration information to the selected core network device 100.

Figure 4:
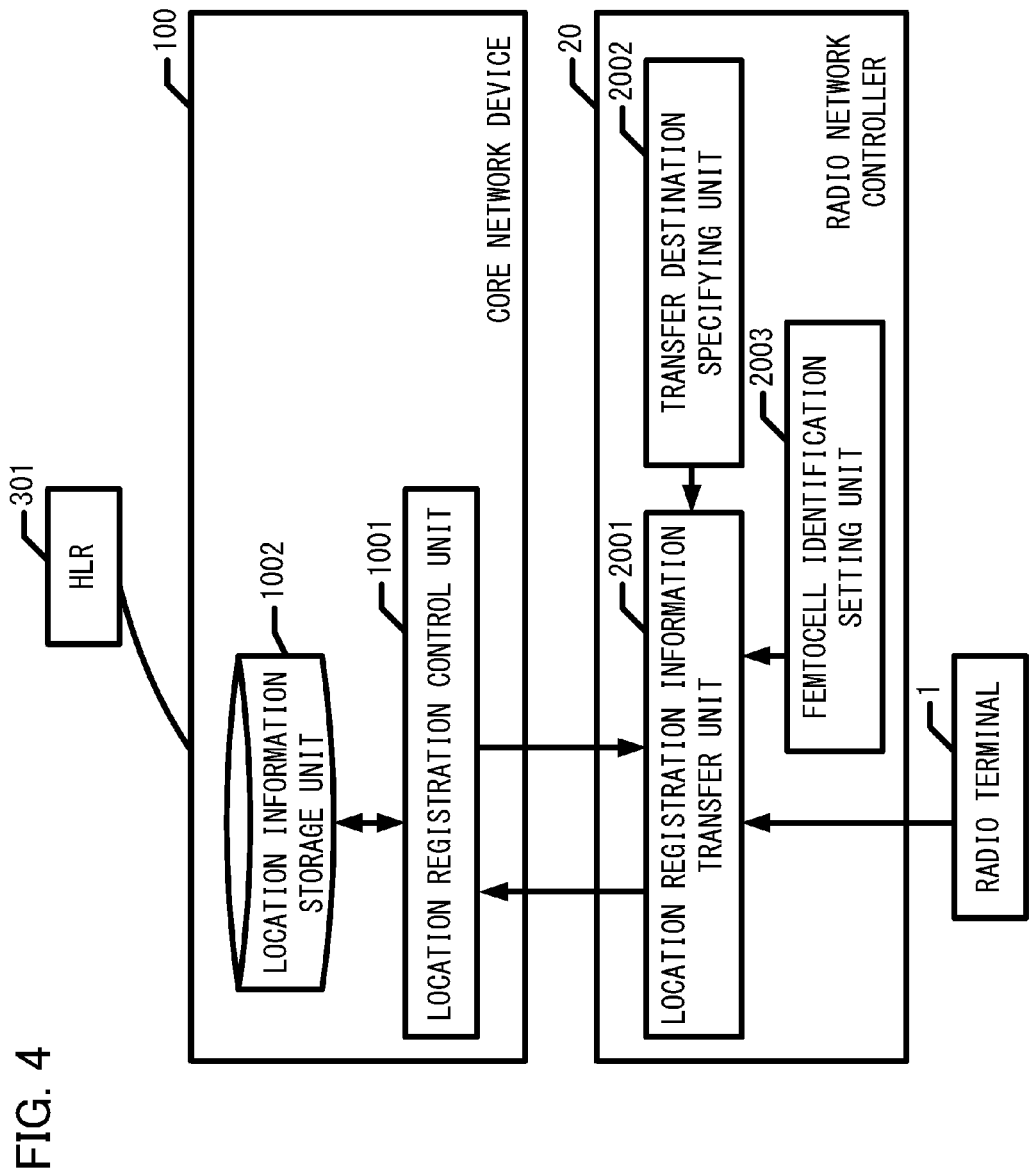
FIG. 4 is a diagram illustrating another configuration regarding the process for transferring location registration information.

FIG. 4 is a diagram illustrating another configuration regarding the process for transferring location registration information. The configuration illustrated in FIG. 4 includes a femtocell identification setting unit 2003 for notifying the core network device 100 that the radio network controller 20 is a femto-RNC.

The radio terminal 1 transmits location registration information. The transmitted location registration information is received at the location registration information transfer unit 2001 of the radio network controller 20 allocated in a radio access area in which the radio terminal 1 locates. Information on core network devices 100 that are selected by the radio network controller 20 is stored in the transfer destination specifying unit 2002. Selection priority is stored in association with the core network devices. The location registration information transfer unit 2001 selects a core network device 100 to which the location registration information is to be transferred, in accordance with the selection priority from the transfer destination specifying unit 2002, and transfers the location registration information to the selected core network device 100. At this time, in accordance with information in the femtocell identification setting unit 2003, a femtocell identification flag is added to a signal of the location registration information to be transferred, the femtocell identification flag indicating whether or not the radio network controller 20 from which the signal is to be transmitted is a femto-RNC, and the signal including the location registration information and the femtocell identification flag is transferred.

The location registration control unit 1001 of the core network device 100 receives the signal of the location registration information, and determines whether or not the storage amount of the location information storage unit 1002 falls within an allowable range. If it is determined, in accordance with the determination result, that the storage amount falls within the allowable range, the location registration control unit 1001 performs control in such a manner that subscriber data, such as location information of the radio terminal, stored in the HLR 301 is stored in the location information storage unit 1002, in accordance with the location registration information. Meanwhile, if it is determined, in accordance with the determination result, that the storage amount exceeds the allowable range and it is determined, by referring to the femtocell identification flag of the transferred signal, that the radio network controller 20, from which the location registration information has been transferred, is a femto-RNC, the location registration control unit 1001 transmits location registration rejection information to the radio network controller 20, from which the location registration information has been transferred. In accordance with the location registration rejection information, the radio network controller 20 is notified that location registration has been rejected.

The radio network controller 20 receives the location registration rejection information, selects a core network device 100 of the next-highest priority in accordance with the selection priority from the transfer destination specifying unit 2002, and transfers the signal containing the location registration information and the femtocell identification flag to the selected core network device 100.

Figure 5:
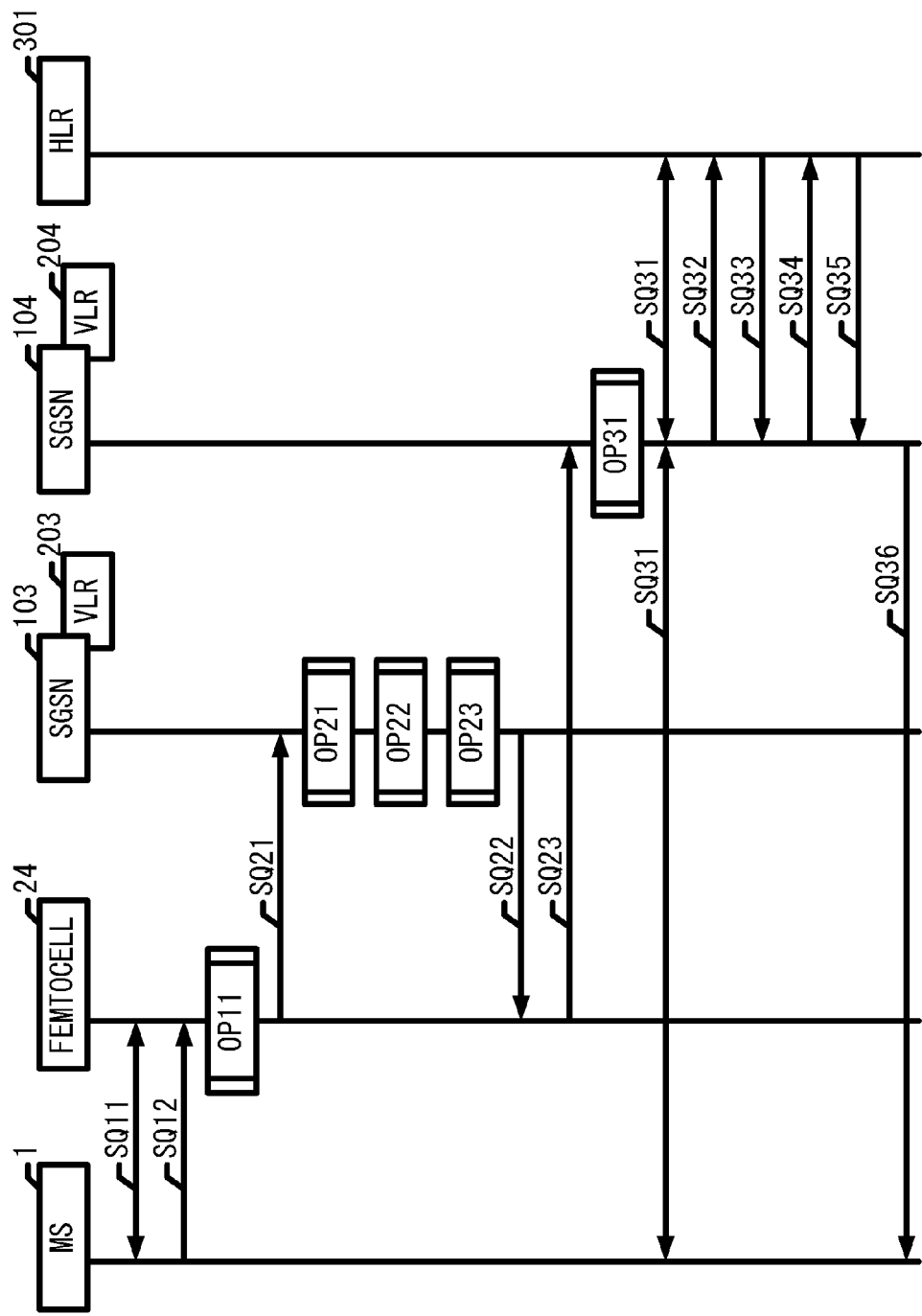
FIG. 5 is a diagram illustrating a sequence in which an SGSN performs location registration of a radio terminal in accordance with location registration information transmitted from the radio terminal.

FIG. 5 is a diagram illustrating a sequence of a location registration method. FIG. 5 illustrates a sequence in which in accordance with location registration information transmitted from a radio terminal (MS 1), the SGSN 100 performs location registration of the MS 1. Note that the explanation will be provided with reference to FIG. 2 for a radio network system in which this sequence is executed and with reference to FIG. 4 for functions relating the execution of this sequence. The sequence illustrated in FIG. 5 is provided on the assumption that in the radio network system explained in FIG. 2, the storage amount of the VLR 203 in the SGSN 103 exceeds an allowable range and the storage amount of the VLR 204 in the SGSN 104 falls within an allowable range. In addition, in order to explain the processing details of the femto-RNC 24, the SGSN 103, and SGSN 104, this sequence includes OP11, OPs 21 to 23 and OP 31 respectively.

SQ11: The MS 1 establishes connection over a radio link (Radio Resource Control Connection) with an RNC allocated in a radio access area in which the MS 1 locates, that is, in this case, the femto-RNC 24.

SQ12: The MS 1 issues a location registration request (Initial Direct Transfer) to the femto-RNC 24.

OP11: The femto-RNC 24 receives location registration information from the MS 1, and creates a message (Initial UE message), which is to be transmitted from an RNC 20 to an SGSN 100. This message contains the location registration request (attach request) and a femtocell identification flag for identifying that the RNC 24 is a device for femtocell (for example, a femtocell identification flag "1" indicates that the RNC 24 is a femto-RNC).

SQ21: The femto-RNC 24 transfers the message (Initial UE message) created in OP11 to an SGSN specified by the transfer destination specifying unit 2002, that is, in this case, to the SGSN 103.

OP21: The SGSN 103 receives the message (Initial UE message), and determines whether or not the storage amount of the VLR 203 exceeds an allowable range. (Here, it is assumed that the storage amount exceeds the allowable range.)

OP22: The SGSN 103 checks the femtocell identification flag contained in the received message (Initial UE message). (Here, it is assumed that the flag indicates "1", which indicates that the RNC 24 is a femto-device.)

OP23: In a case where it is determined in OP21 that the storage amount of the VLR 203 exceeds the allowable range and it is checked in OP22 that the femtocell identification flag indicates "1", the SGSN 103 creates a message (Direct Transfer). This message is a message (Direct Transfer) for notifying an RNC 20 that location registration has been rejected because the number of subscribers to be managed by an SGSN 100 exceeds an allowable range. Here, this message includes a message indicating "the number of subscribers to be managed exceeds the allowable range" as a rejection cause.

SQ22: The SGSN 103 transfers the message (Direct Transfer) created in OP23 to the femto-RNC 24, from which the message (Initial UE message) has been transferred.

SQ23: The femto-RNC 24 receives the message (Direct Transfer) in which the rejection cause is described, and transfers the message (Initial UE message) created in OP11 to an SGSN 100 that is next specified by the transfer destination specifying unit 2002, that is, in this case, to the SGSN 104.

OP31: The SGSN 104 receives the message (Initial UE message), and determines whether or not the storage amount of the VLR 204 exceeds an allowable range. (Here, it is assumed that the storage amount does not exceed the allowable range.)

SQ31: The SGSN 104 performs, with the MS 1 and the HLR 301, checking for a radio terminal whose location is to be registered and security setting such as setting of procedures for prevention of data tampering and wiretapping.

SQ32: The SGSN 104 notifies the HLR 301 that location registration of the radio terminal (MS 1) will be performed.

SQ33: The HLR 301 transfers subscriber data of the radio terminal (MS 1) to the SGSN 104. The SGSN 104 stores the subscriber data of the radio terminal MS 1 in the VLR 204.

SQ34: The SGSN 104 notifies the HLR 301 that processing for the subscriber data of the radio terminal (MS 1) has been completed normally.

SQ35: The HLR 301 notifies the SGSN 104 that an operation for updating the location registration of the radio terminal (MS 1) has been completed.

SQ36: The SGSN 104 transmits a message (Direct Transfer) indicating that the location registration request (attach request) has been accepted (Attach accept) to the radio terminal MS 1.

Note that in the explanation of FIG. 5, it is assumed that the radio access area in which the radio terminal MS 1 locates is only the area of the femto-RNC 24. However, also in an RNC that is not a device for femtocell (femto-RNC), processing for selecting a different SGSN 100 may be performed in a case where it is determined in OP21 that the storage amount exceeds the allowable range. That is, processing may be performed such that the determination result regarding a femtocell identification flag is not taken into consideration in OP23.

Figure 6:
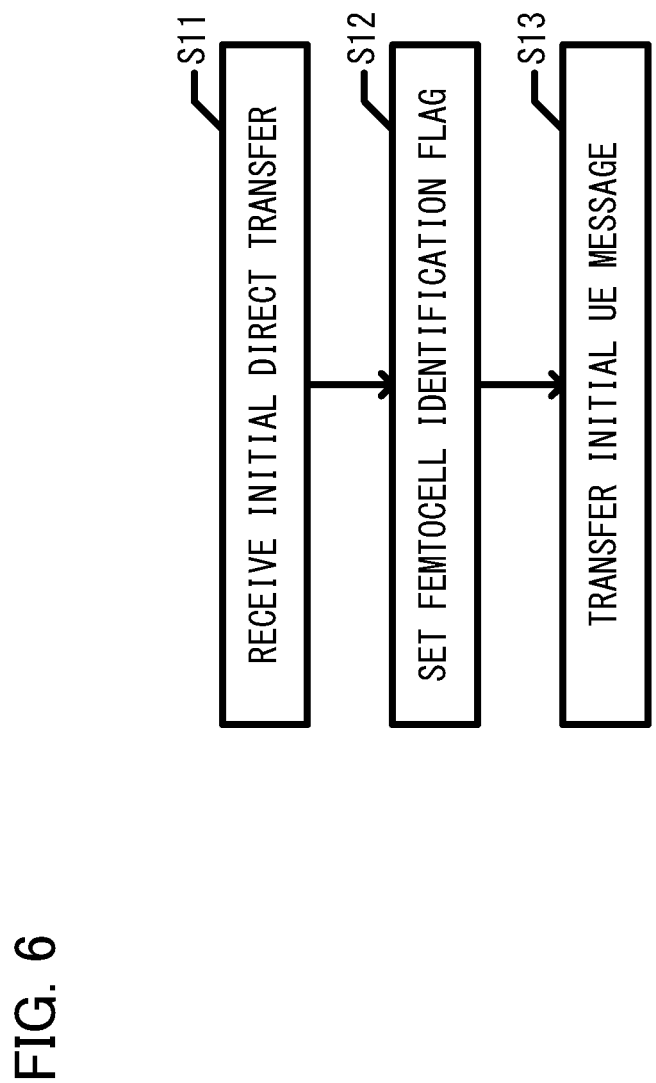
FIG. 6 is a diagram illustrating a processing flow of a radio network controller.

FIG. 6 is a diagram illustrating a processing flow of a radio network controller.

S11: The radio network controller 20 (for example, the femto-RNC 24) receives location registration information (Initial Direct Transfer) transmitted from a radio terminal (MS 1).

S12: The RNC 20 creates a message (Initial UE message) to be transmitted to the SGSN 100. This message includes a message in which a location registration request (attach request) based on the received location registration information (Initial Direct Transfer) and a femtocell identification flag for notifying that the radio network controller is a femto-RNC are set.

S13: The RNC transfers the message (Initial UE message) created in step S12 to the core network device 100 (for example, the SGSN 103 or 104) specified by the transfer destination specifying unit 2002.

Figure 7:
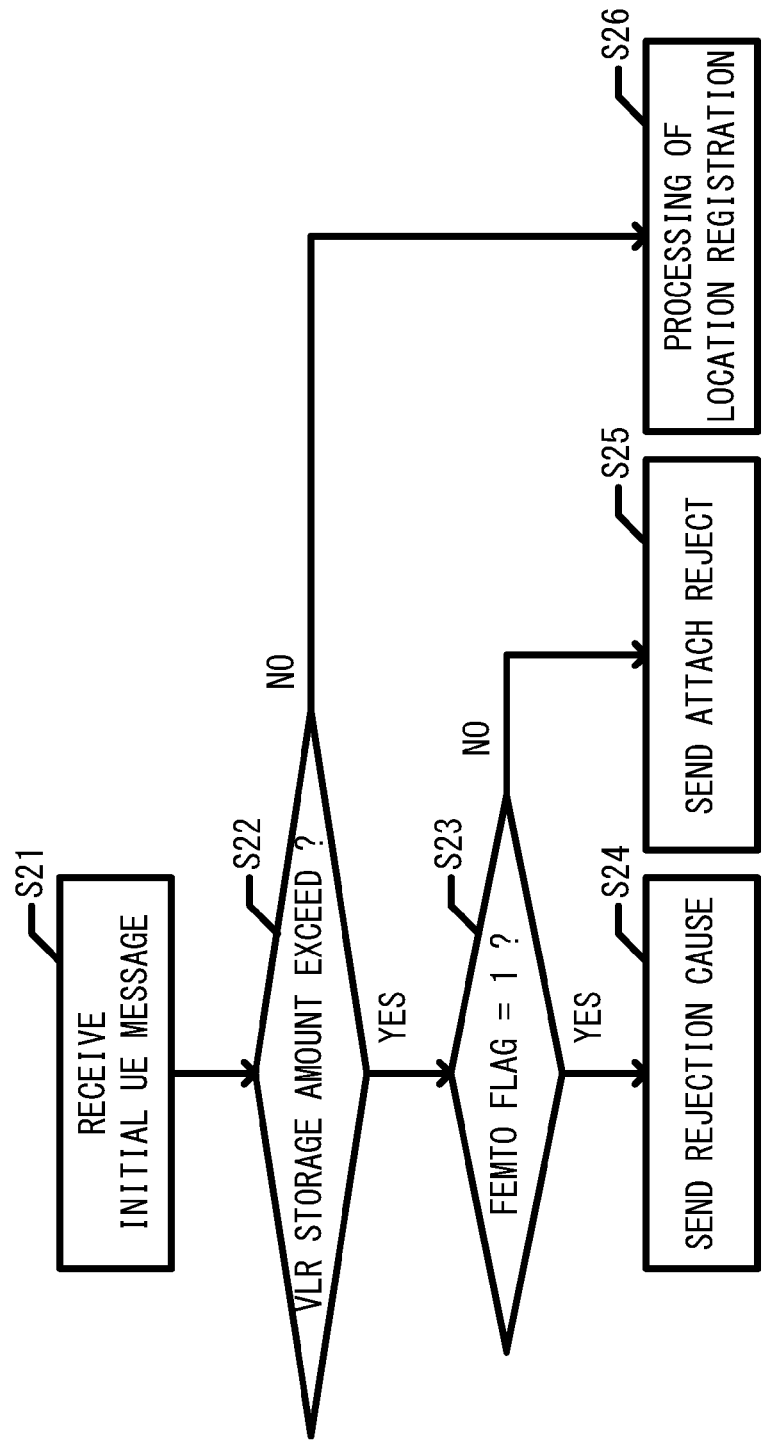
FIG. 7 is a diagram illustrating a processing flow of a core network device.

FIG. 7 is a diagram illustrating a processing flow of a core network device.

S21: The core network device 100 (for example, the SGSN 103 or 104) receives a message (Initial UE message) transferred from the radio network controller 20 (for example, the femto-RNC 24).

S22: The core network device 100 determines whether or not the storage amount of the location information storage unit 1002 (for example, the VLR 203 or 204) exceeds an allowable range. In a case where the storage amount exceeds the allowable range, step S23 is performed. Meanwhile, in a case where the storage amount does not exceed the allowable range, step S26 is performed.

S23: The core network device 100 checks the femtocell identification flag included in the received message (Initial UE message). If the flag indicates "1" (if the device from which the message has been transmitted is a femto-RNC), step S24 is performed. Meanwhile, if the flag indicates "0", step S25 is performed.

S24: The case where the storage amount of the location information storage unit 1002 exceeds the allowable range and a location registration request is issued from a radio terminal (MS 1) under the control of a device for femtocell (for example, femto-RNC). The core network device 100 transmits a message (Direct Transfer) including information indicating "the number of subscribers to be managed exceeds the allowable range" as a rejection cause to the radio network controller 20 (for example, the femto-RNC 24), from which the message (Initial UE message) has been transmitted.

S25: The case where the storage amount of the location information storage unit 1002 exceeds the allowable range and the radio terminal (MS 1) that has issued a location registration request is not under the control of the device for femtocell. The core network device 100 transmits a message (Direct Transfer) including information indicating "the location registration request is rejected (Attach reject)" as a rejection cause to the radio network controller 20, from which the message (Initial UE message) has been transmitted.

S26: The case where the storage amount of the location information storage unit 1002 does not exceed the allowable range. The core network device 100 performs processing of location registration for the HLR 301 and the radio terminal MS 1.

Note that in the explanation of FIG. 7, it is assumed that the radio access area in which the radio terminal (MS 1) locates is only the area of the femto-RNC 24. However, also in response to a location registration request from an RNC that is not a device for femtocell (femto-RNC), in a case where the storage amount of a VLR exceeds, a message (Direct Transfer) in which "the number of subscribers to be managed exceeds the allowable range" is described as a rejection cause may be transmitted. That is, processing may be performed such that step S23 is not taken into consideration.

FIG. 8 is a diagram illustrating an example of an Initial UE message. FIG. 8 illustrates a message in a radio interface initial layer to be transmitted from a radio network controller (RNC 20) to a core network device (SGSN 100). Individual elements of SI11 to SI21 in FIG. 8 are defined, for example, in Chapter 9.1.33 of 3GPP TS 25.413 (3rd Generation Partnership Project; Technical Specification Group Radio Access Network; UTRAN Iu interface RANAP signalling). In a case where the radio network controller 20 that transmits the Initial UE message is a device for femtocell, that is, a small-sized RNC (femto-RNC), a femtocell identification flag (femto flag) in SI22 indicates "1". The femto flag is an element for notifying a core network device (SGSN 100) that a radio network controller (RNC 20) transmitting this message is a femto-RNC.

Figure 9:
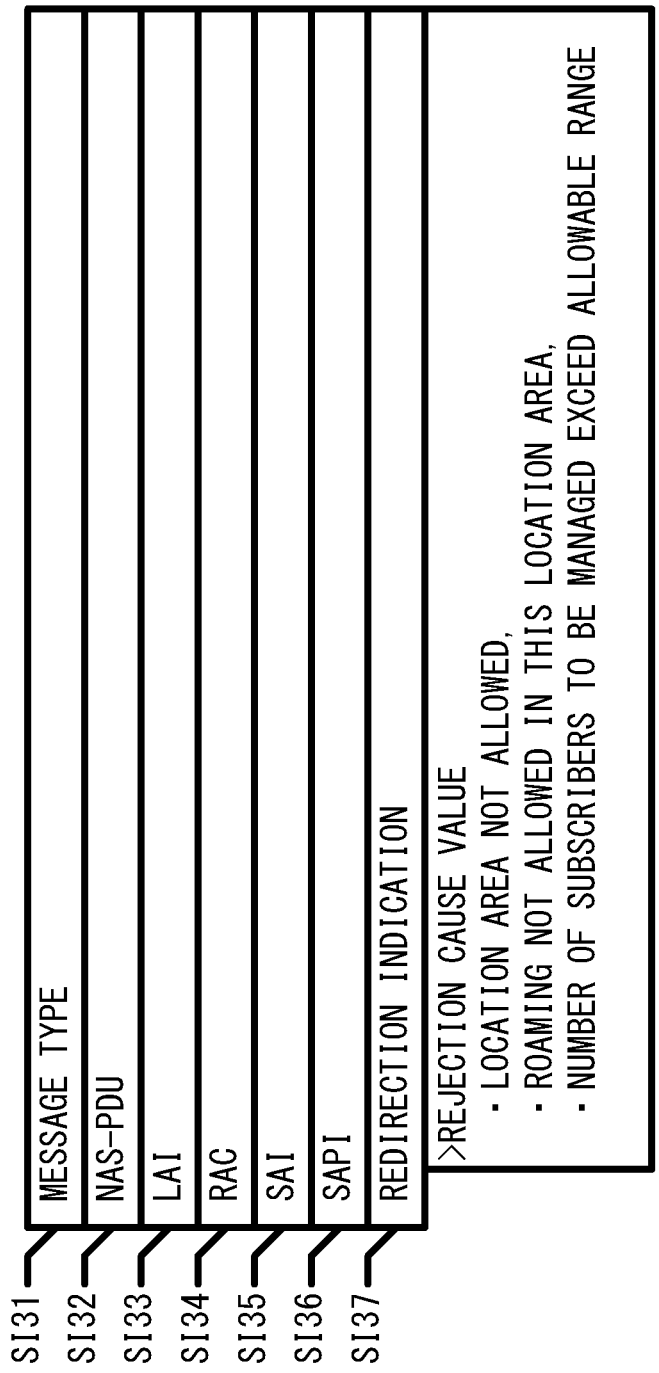
FIG. 9 is a diagram illustrating a message for transmitting NAS information via an Iu interface between a radio network controller and a core network device.

FIG. 9 is a diagram illustrating an example of a Direct Transfer message, which is a message for transmitting NAS information (No Access Stratum information) via an Iu interface between a radio network controller (RNC 20) and a core network device (SGSN 100). FIG. 9 illustrates, in particular, a message transmitted from the SGSN 100 to the RNC 20. Individual elements of SI31 to SI36 in FIG. 9 are defined, for example, in Chapter 9.1.34 of 3GPP TS 25.413. "Redirection Indication" in SI37 is an element defined, for example, in Chapter 9.2.3.36 of 3GPP TS 25.413, and new setting "the number of subscribers to be accommodated exceeds the allowable range" is added to "Reject Cause Value" defined here. The added setting "the number of subscribers to be accommodated exceeds the allowable range" is one example of "Rejection Cause Value" transmitted from the SGSN 100 to the RNC 20 in a case where the storage amount of the location information storage unit 1002 (corresponding to the visitor location register VLR 200) in a core network device (SGSN 100) exceeds an allowable range.

According to this embodiment, in a case where a radio terminal (MS 1) issues a location registration request in a radio access area of a femtocell radio network controller (femto-RNC 24), the femto-RNC 24 transfers an Initial UE message of the location registration request including an effective femtocell identification flag to a selected one of a plurality of core network devices (SGSNs 100) that control the femto-RNC 24. In a case where the amount of subscriber data to be stored in the visitor location register (VLR 200) of the SGSN 100 that has received the Initial UE message exceeds the allowable range and the femtocell identification flag is effective, a Direct Transfer message in which "the number of subscribers to be managed exceeds the allowable range" is set is transmitted from the SGSN 100 to the femto-RNC 24. The femto-RNC 24 receives the Direct Transfer message, and transfers the Initial UE message of the location registration request which has been transferred previously, to another SGSN 100 specified from among the plurality of core network devices (SGSNs 100) that control the femto-RNC 24.

Consequently, the femto-RNC 24 is connected to any one of the SGSNs 100 that control the femto-RNC 24. In a case where the storage amount of the visitor location register (VLR) in an SGSN 100 to which the femto-RNC 24 is connected exceeds an allowable range, the femto-RNC 24 is connected to a different SGSN 100, and location registration is performed by storing subscriber data of a radio terminal (MS 1) in a VLR of the different SGSN 100.

In addition, an example in which a pool area including a plurality of SGSNs 100 is provided and an RNC controlled by the SGSNs 100 within the pool area is a femto-RNC has been explained above. However, this embodiment may be applied to an RNC, as well as a femto-RNC (small-sized RNC), and similar advantages is achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A radio network system comprising:
 a plurality of mobile stations at least one of which is receiving communications via a femto radio network controller;
 the femto radio network controller operable to receive first location registration information for a location registration request from the mobile station, operable to transmit second location registration information including a femtocell identifier used to identify that the femto radio network controller is a device for a femtocell in the first location registration information to a first core network device;
 the first core network device operable to receive the second location registration information transmitted from the femto radio network controller, operable to transmit location registration rejection information used to indicate a rejection of storing location information to the femto radio network controller in cases that an amount of storage required for storing the location information exceeds a predetermined value, the location registration rejection information being transmitted to prevent a mobile station from failing to receive communication from the femtocell due to the amount of storage being insufficient, the location registration rejection information indicating that a number of subscribers to be managed within the femtocell exceeds an allowable range; and
 a second core network device operable to receive the second location registration information transmitted from the radio network controller that have received the location registration rejection information transmitted from the first core network device.

2. The radio network system according to claim 1, wherein the radio network system includes a plurality of core network devices and the femto radio network controller operable to select the second core network device from the plurality of core network devices.

3. The radio network system of claim 1, wherein the amount of storage is an amount of storage available within a visitor location register (VLR).

4. The radio network system of claim 3, wherein the VLR is a VLR of a support node through which the mobile station is to receive services providing by the home location register (HLR).

5. A core network device operable to control communication services available to any of mobile stations in connection with a femto radio network controller, the core network device comprising:
 a Visitor Location Register (VLR) operable to store location information of the mobile stations; and
 a Serving General Packet Radio Service (GPRS) Support Node (SGSN) operable to discontinue registering location information, operable to transmit location registration rejection information used to indicate a rejection of storing the location information, in cases that an amount of storage required for storing the location information exceeds a predetermined value, and the femto radio network controller is the device for a femtocell based on a femtocell identifier used to identify that the femto radio network controller is a device for a femtocell, when location registration information transmitted from the femto radio network controller is stored in the SGSN,
 wherein the location registration rejection information is transmitted to prevent a mobile station from failing to receive communication from the femtocell due to the amount of storage being insufficient, and
 the location registration rejection information indicating that a number of subscribers to be managed within the femtocell exceeds an allowable range.

6. The core network device of claim 5, wherein the amount of storage is an amount of storage available within the VLR.

7. The core network device of claim 6, wherein the VLR is a VLR of a support node through which the mobile station is to receive services providing by the home location register (HLR).

8. A femto radio network controller operable to control and assign a radio link to any of mobile stations, the femto radio network controller comprising:
 a processor operable to select a core network device to which location registration information is transmitted, from a plurality of core network devices in a pool area in which the plurality of core network devices are managed by the femto radio network controller; and
 a transceiver operable to transmit the location registration information including a femtocell identifier used to identify that the femto radio network controller is the device for a femtocell in the location registration information transmitted to the femto radio network controller from the mobile station for the location registration request, to the core network device selected by the processor;
 wherein the processor selects the core network device differing from the core network device that has already selected in the pool area, when the transceiver receives location registration rejection information used to indicate a rejection of storing the location information in cases that an amount of storage required for storing the location information exceeds a predetermined value, transmitted from the core network device, wherein the location registration rejection information is transmitted to prevent a mobile station from failing to receive communication from the femtocell due to the amount of storage being insufficient, and the location registration rejection information indicating that a number of subscribers to be managed within the femtocell exceeds an allowable range.

9. The femto radio network controller according to claim 8, wherein the femto radio network controller is a device operable to control and assign the radio link to any of mobile stations in a small group.

10. The femto radio network controller of claim 8, wherein the amount of storage is an amount of storage available within a visitor location register (VLR).

11. The femto radio network controller of claim 10, wherein the VLR is a VLR of a support node through which the mobile station is to receive services providing by the home location register (HLR).

* * * * *